United States Patent [19]

Whiting

[11] Patent Number: 5,555,137
[45] Date of Patent: Sep. 10, 1996

[54] REPAIR KIT FOR AN ADJUSTABLE SIDE VIEW MIRROR FOR VEHICLES

[76] Inventor: Scott F. Whiting, 90 Briarheath La., Clark, N.J. 07066

[21] Appl. No.: 429,515

[22] Filed: Apr. 26, 1995

[51] Int. Cl.⁶ .............................. G02B 7/182; B60R 1/06
[52] U.S. Cl. ...................... 359/872; 359/873; 248/467; 248/476; 248/488
[58] Field of Search .................................. 359/838, 846, 359/847, 848, 849, 871, 872, 873, 874, 896; 248/467, 468, 488, 476

[56] References Cited

U.S. PATENT DOCUMENTS

| | | | |
|---|---|---|---|
| 3,588,025 | 6/1971 | Gersman | 359/873 |
| 4,149,779 | 4/1979 | Hamerdinger et al. | 359/873 |
| 4,277,140 | 7/1981 | Manzoni | 359/872 |
| 4,605,292 | 8/1986 | McIntosh | 248/467 |
| 4,648,692 | 3/1987 | Kinoshita | 359/873 |
| 4,807,592 | 2/1989 | Trihey | 359/871 |
| 4,807,839 | 2/1989 | Nettleton et al. | 359/873 |

OTHER PUBLICATIONS

Adams et al; "Adustable Mirror Mount"; IBM Technical Disclosure Bulletin; vol. 18; No. 9; Feb. 1976; pp. 2780–2781.

Primary Examiner—Ricky D. Shafer
Attorney, Agent, or Firm—Ezra Sutton

[57] ABSTRACT

A repair kit for repair and retrofit of an adjustable side view mirror for vehicles having four pliable mounting-bracket assemblies, each having a mirror-engaging adjustment screw for engaging and adjusting the position of the side view mirror within a mirror casing. The kit also includes four pieces of double-sided adhesive tape, each for securing and mounting each of the mounting-bracket assemblies to the inside surface of the mirror casing. Each of the mounting bracket assemblies also has a base member with a bottom surface for adhering one side of the double-sided adhesive tape thereto.

3 Claims, 3 Drawing Sheets

REPAIR KIT FOR AN ADJUSTABLE SIDE VIEW MIRROR FOR VEHICLES

FIELD OF THE INVENTION

This invention relates to a repair kit for an adjustable side view mirror for vehicles.

BACKGROUND OF THE INVENTION

Present side view adjustable mirrors for automobiles, trucks, vans, and the like, when they are broken or are partially inoperative, are costly to repair, as the replacement parts are costly and labor intensive. When the adjustable side view mirror fails, it is usually due to the kinking, breaking, or rusting of the cable, which adjusts the mirror to its proper position. The kinking of the cable results in the mirror not being able to be adjusted to the limits it was designed for. The broken cable allows the mirror to move around constantly. Thus, no set position of the side view mirror is obtainable. The rusted cable (due from dampness, condensation, corrosion of metal wires, and the like) inhibits the operator from positioning the mirror in a proper view setting, as the mirror usually is stuck in a permanent and non-movable position.

To repair these aforementioned problems of a kinked, broken, or rusted mirror cable, the repair time is considerable in terms of labor, as the door panel(s) must be removed, along with the covering around the control knob which operates the side view mirror. This labor expense for repairing the mirror cable is in the hundreds of dollars, depending upon the make and model of the vehicle. Replacement of the entire side view mirror unit with a new fixture would even be more costly, approximately double the expense of repairing the mirror cable.

It would be highly desirable to have a side view, adjustable mirror repair kit for vehicles, where there is an ease of installation by the vehicle owner at a minimal cost and time, using only a screwdriver.

DESCRIPTION OF THE PRIOR ART

Screw mounts for adjusting a mirror have generally been disclosed in the prior art. U.S. Pat. No. 3,182,552 to Audy discloses a nine-point flotation mirror holding device for holding a mirror for proper adjusting of the position of the mirror by the use of three adjusting screws against three triangular support pads to change the position of the mirror.

U.S. Pat. No 4,648,692 to Kinoshita discloses a manipulator device for a reflecting mirror having a mirror holder receiver mounted on a mirror housing. There are a plurality of compression springs and a plurality of adjusting bolts for pressing against the rear surface of a mirror holder for adjusting the position of the mirror within the mirror holder. Springs allow the mirror to move rearwardly when the bolts are rotated in the opposite direction.

U.S. Pat. No. 4,925,286 to Cutburth discloses a three-point spherical mirror mount having an adjustment ring affixed to a pivot ring via screws. To provide suitable adjustment of the mirror, set screws are oriented to give proper alignment of the mirror by a simple adjustment of a hand wrench. This is done by the pressing of the set screws against the spherical base.

The prior art patents do not disclose a repair kit having double-sided tape for easily and quickly mounting screw mounts with adjusting screws inside a mirror casing, nor a simple method for quickly repairing an adjustable side view mirror for a vehicle which is partially inoperable or completely broken.

Accordingly, it is an object of the present invention to provide a repair kit for the repair and retrofit of an adjustable side view mirror for vehicles, which is easily and quickly installed, at a minimal cost, and using only a screwdriver.

Another object of the present invention is to provide a repair kit where the component parts are made of a durable and transparent plastic material to withstand all types of weather conditions, bad road conditions, and pliable enough to be mounted in any side view mirror casing without damage to the paint or mirror casing of the vehicle.

Another object of the present invention is to provide a repair kit that is designed to be fully adaptable and adjustable for different makes and models of most vehicle side view mirrors, such that the repair can be either a temporary or permanent installation.

A further object of the present invention is to provide a repair kit having simple repair instructions and a minimal number of steps.

A still further object of the present invention is to provide a repair kit that can be mass produced in an automated and economical manner.

SUMMARY OF THE INVENTION

In accordance with the present invention, there is provided a novel repair kit that may be used for the retrofitting and repair of a completely broken or partially damaged adjustable side view mirror for a car, a truck, a van, a motor home, or the like. The repair kit includes four pliable, plastic mounting-bracket assemblies having four mirror-engaging adjustment screws and four sectional pieces of double-sided adhesive tape. Each mounting bracket is an integrally-molded plastic unit having a base and an upright member.

The repair kit would be able to retrofit most models of adjustable side view mirror components for many types of vehicles at a minimal cost and in a minimal repair time.

BRIEF DESCRIPTION OF THE DRAWINGS

Further objects, features, and advantages of the present invention will become apparent upon consideration of the detailed description of the presently-preferred embodiments, when taken in conjunction with the accompanying drawings, wherein.

DETAILED DESCRIPTION OF THE PREFERRED INVENTION

Figure 1:
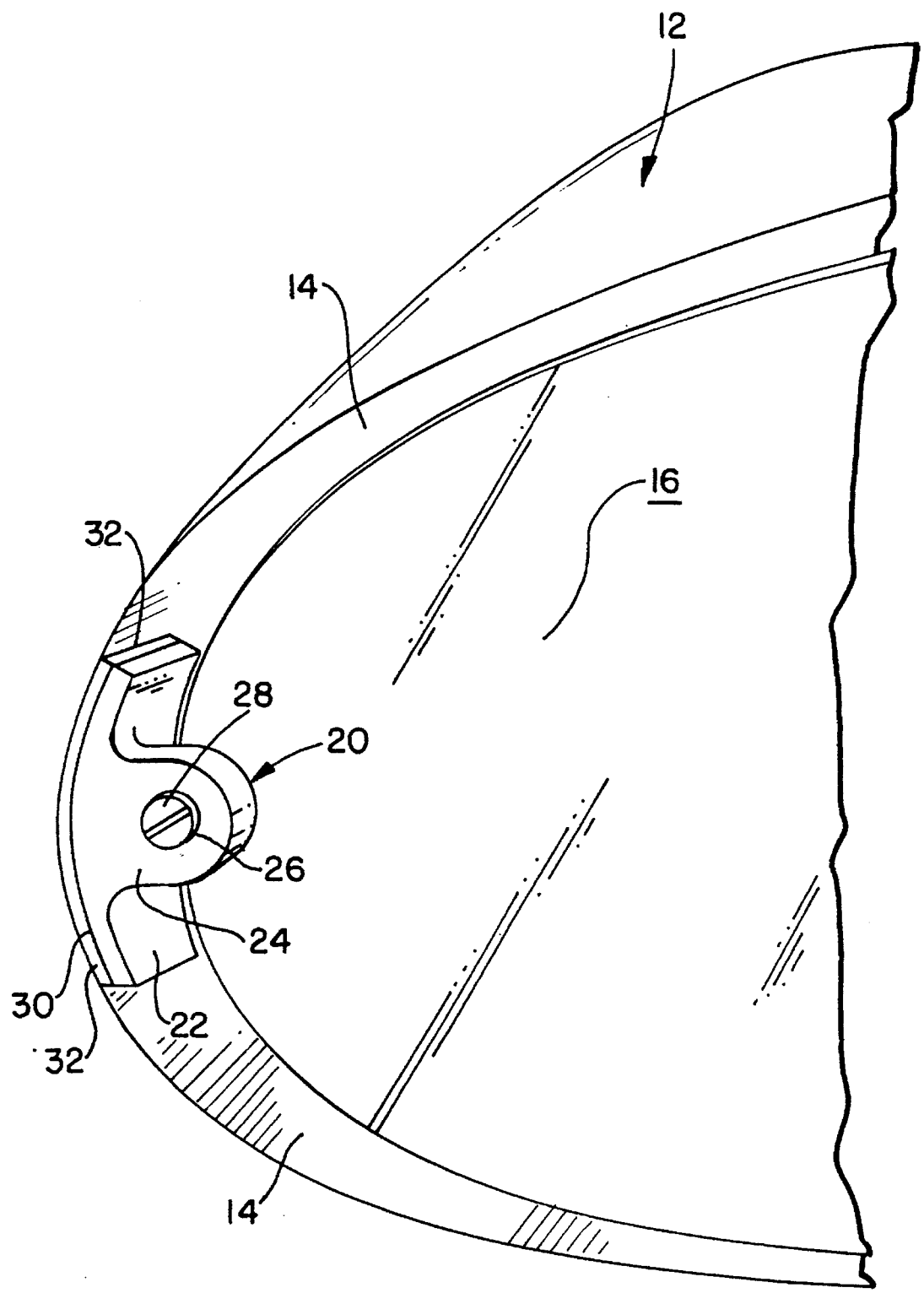
FIG. 1 is an enlarged sectional perspective view of the present invention showing one of the mirror mounting bracket assemblies in position on a mirror.
Figure 2:
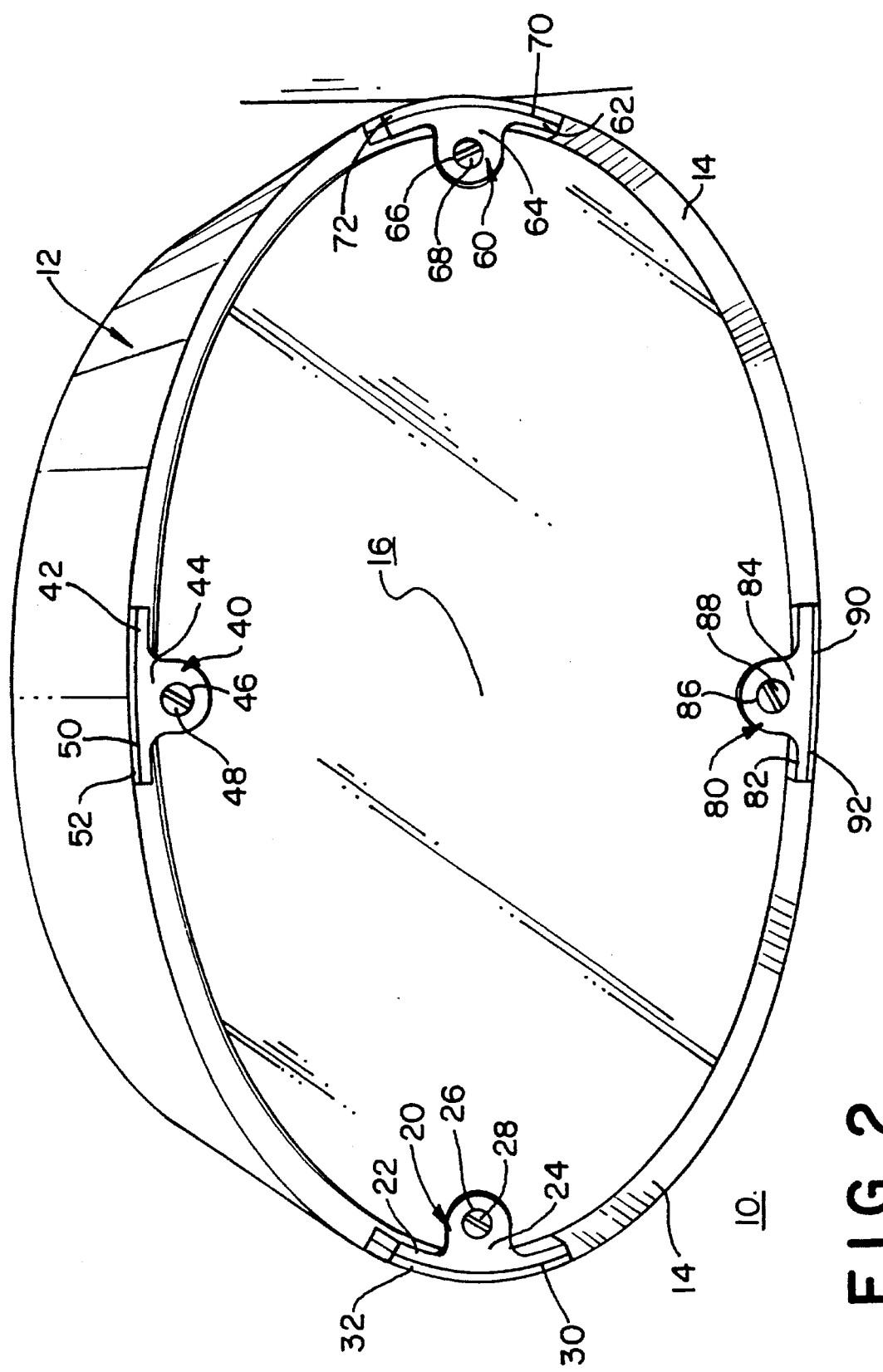
FIG. 2 is a perspective view of the present invention showing four mirror-mounting bracket assemblies in position on a mirror.
Figure 3:
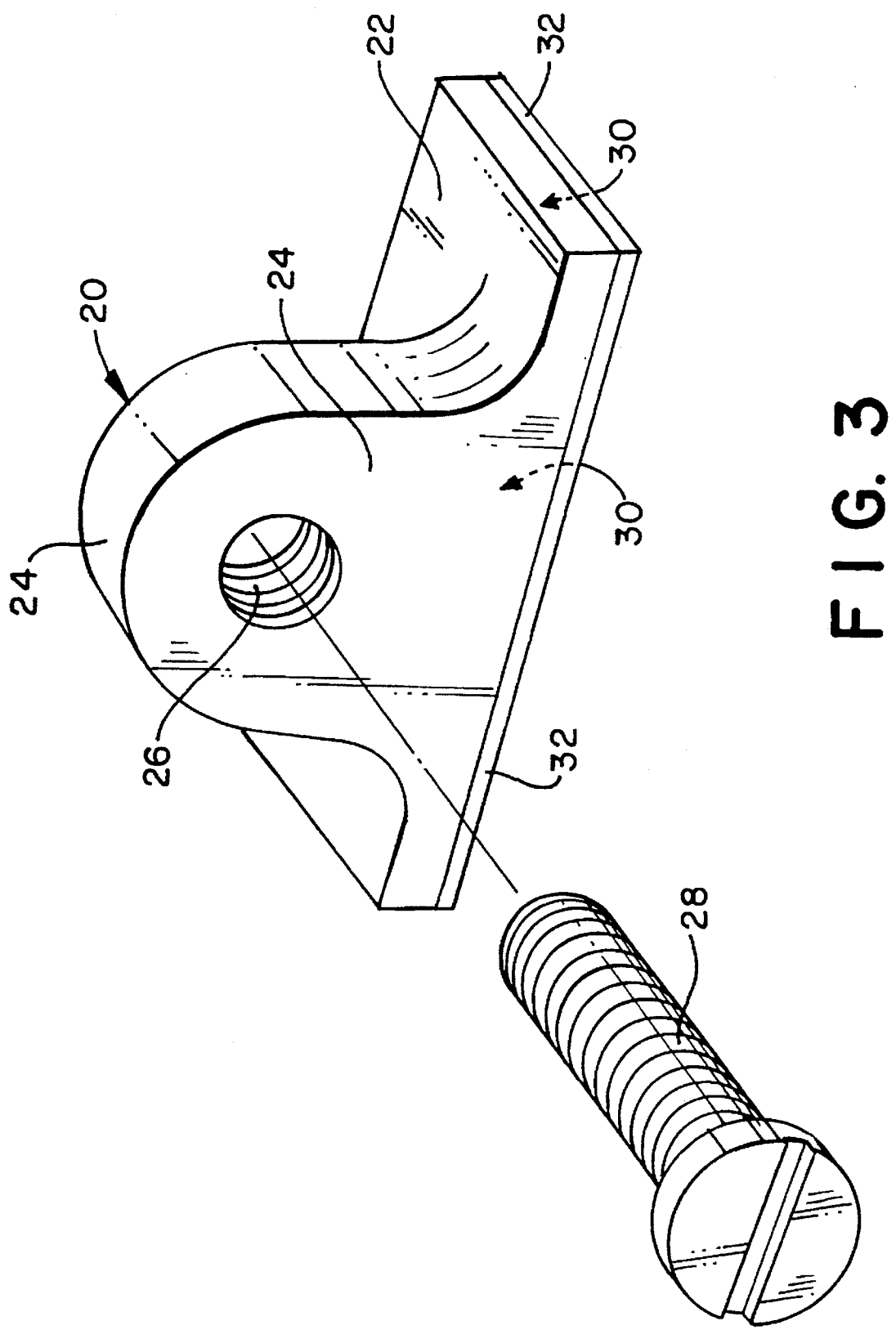
FIG. 3 is an exploded perspective view of the present invention showing the mirror-mounting bracket, engaging screw and double-sided tape.

The repair kit 10 of the present invention used for retrofitting of an adjustable side view mirror 12 of a vehicle is shown in detail in FIGS. 1 through 3. The repair kit 10 includes four pliable, mounting-bracket assemblies 20, 40, 60, and 80 and, in some cases, a replacement mirror 16. Each mounting-bracket assembly 20, 40, 60, and 80 is formed of a pliable, transparent, durable plastic. Each assembly 20, 40,

60, and 80 includes a respective base member 22, 42, 62, and 82 integrally attached to a respective upright member 24, 44, 64, and 84, and each having a respective centrally-located threaded hole 26, 46, 66, and 86 for holding of a respective plastic, mirror-engaging slotted, adjustment screw 28, 48, 68, and 88. There is a respective double-sided adhesive tape 32, 52, 72, and 92 of high bonding and adhesive strength for adhering to the bottom surface 30, 50, 70, and 90 of each base member 22, 42, 62, and 82 on each mounting assembly 20, 40, 60, and 80. The other adhesive surface of tape 32, 52, 72, and 92 is to be adhered to the inside surface 14 of adjustable mirror casing 12 at four spaced-apart locations. The repair kit 10 is also available without a replacement mirror 16 being included in the kit.

The physical measurements of each mounting bracket assembly 20, 40, 60, and 80 is as follows: The rectangular base member 22, 42, 62, and 82 measures 7.875 mm in width by 19.05 mm in length and 1.525 mm in thickness; the upright member 24, 44, 64, and 84 measures 9.652 mm in width by 9.652 mm in height and 4.825 mm in thickness; and the centrally-located threaded hole 26, 46, 66, and 86 is located 6.35 mm in height from bottom surfaces 30, 50, 70, and 90 and has a threaded core diameter of 3.785 mm. The measurement tolerances of the mounting bracket 20, 40, 60, and 80 is plus or minus 0.254 mm.

METHOD OF OPERATION OF THE PRESENT INVENTION

In using the repair kit 10 for a retrofitting of a broken adjustable side view mirror 12, the following procedure is followed. The first step is wiping clean and removing of any dirt, oil, or grime from the inside surface 14 of mirror casing 12 using a soapy detergent and/or grease remover. It is not necessary to remove the existing cable system or to disconnect it. The mounting assemblies of the present invention override the existing hardware. The next step is the removal of the paper covering from one side of the respective double-sided tape 32, 52, 72, and 92 and applying it to the respective bottom surface 30, 50, 70, and 90 of base member 22, 42, 62, and 82. The other paper covering is removed from the other side of the doubled-sided tape 32, 52, 72, and 92, and each of the mounting-bracket assemblies 20, 40, 60, and 80 is positioned at the appropriate place within the inside cleaned surface 14 of mirror casing 12 and is adhered at four locations, as shown in FIG. 2 of the drawings. The final step is the adjusting of the four mirror-engaging adjustment screws 28, 48, 68, and 88 to hold the mirror 16 firmly in place and to adjust it to the proper position for the side viewing of other vehicular traffic for the current operator driver. The adjustment is performed simply and quickly by using a screwdriver to turn the slotted adjustment screws, until the proper viewing position is obtained.

ADVANTAGES OF THE PRESENT INVENTION

Accordingly, an advantage of the present invention is that it provides a repair kit for the repair and retrofit of an adjustable side view mirror for vehicles, which is easily and quickly installed, at a minimal cost, and using only a screwdriver.

Another advantage of the present invention is that it provides a repair kit where the component parts are made of a durable and transparent plastic material to withstand all types of weather conditions, bad road conditions, and pliable enough to be mounted in any side view mirror casing without damage to the paint or mirror casing of the vehicle.

Another advantage of the present invention is that it provides a repair kit that is designed to be fully adaptable and adjustable for different makes and models of most vehicle side view mirrors, such that the repair can be either a temporary or permanent installation.

A further advantage of the present invention is that it provides a repair kit having simple repair instructions and a minimal number of steps.

A still further advantage of the present invention is that it provides a repair kit that can be mass produced in an automated and economical manner.

A latitude of modification, change, and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. A repair kit for repair and retrofit of an adjustable side view mirror for vehicles, comprising:
   a) four pliable mounting-bracket assemblies, each having a mirror-engaging adjustment screw for directly engaging and adjusting the position of the side view mirror within a mirror casing;
   b) four pieces of double-sided adhesive tape, each for securing and mounting each of said mounting-bracket assemblies to the inside surface of said mirror casing; and
   c) each of said mounting bracket assemblies having a base member with a bottom surface for adhering one side of said double-sided adhesive tape thereto.

2. A repair kit in accordance with claim 1, wherein each mounting-bracket assembly includes an upright member extending from said base member, and each upright member includes a passageway for receiving one of said adjustment screws.

3. A repair kit in accordance with claim 1, wherein said mounting-bracket assemblies and said adjustment screws are formed of transparent plastic material.

* * * * *